United States Patent Office 3,370,092
Patented Feb. 20, 1968

3,370,092
9-AMINOALIPHATIC TRIPTYCENES AND SALTS THEREOF
Edmund C. Kornfeld, Indianapolis, Ind., assignor to Eli Lilly and Company, Indianapolis, Ind., a corporation of Indiana
No Drawing. Filed Dec. 28, 1964, Ser. No. 421,690
6 Claims. (Cl. 260—570.6)

This invention relates to novel compositions of matter. More particularly, it relates to novel triptycenes having basically substituted side chains at the bridgehead position, to the acid addition salts thereof, and to novel intermediates therefor.

The novel triptycenes herein described have been found to possess totally unexpected and significant anti-inflammatory properties.

It is an object of this invention to provide new and previously unknown triptycenes containing basically substituted side chains at the bridgehead position. Another object is to provide these novel substituted triptycenes in the form of their acid addition salts. A further object of this invention is to provide methods of preparing these novel triptycenes and the acid addition salts thereof.

The present invention comprises the steps of reacting 9-($\beta$-carbomethoxyethyl)anthracene with benzyne to yield 9-($\beta$-carbomethoxyethyl)triptycene, amidating the latter in a known manner to produce triptycene-9-propionamide, and reducing the latter to 9-(3-aminopropyl)-triptycene; and the optional steps of subjecting the triptycene-9-propionamide to chain shortening in a known manner to produce the 9-($\beta$-aminoethyl)triptycene, or to chain lengthening in a known manner to produce the 9-(4-aminoalkyl)triptycene, wherein "alkyl" is $C_4$ alkyl or higher.

The novel compounds of this invention contain the highly symmetrical, aromatic, but non-planar, triptycene blocking function, and are distinguished by the basically substituted side chains affixed at the number 9, or bridgehead, position of the molecule.

The novel compounds of this invention are conveniently represented by the following Formula I,

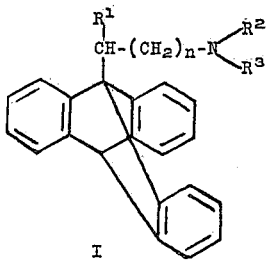

wherein $R^1$ is hydrogen or hydroxyl; $R^2$ and $R^3$ are hydrogen or $C_1$–$C_{24}$ alkyl; $n$ is a number from 1 to 18; and the acid addition salts thereof. When $R^2$ and $R^3$ are $C_1$–$C_{24}$ alkyl, they are illustratively methyl, ethyl, propyl, isopropyl, isobutyl, sec.-butyl, isoamyl, butyl, amyl, octyl, decyl, isooctyl, tridecyl, octadecyl, eicosyl, heneicosyl, docosanyl, tricosanyl, tetracosanyl, and the like.

Compounds coming within the scope of the general formula, supra, include:

9-($\beta$-aminoethyl)triptycene,
9-($\beta$-methylaminoethyl)triptycene,
9-($\beta$-dimethylaminoethyl)triptycene hydrochloride,
9-($\beta$-amino-$\alpha$-hydroxyethyl)triptycene hydrochloride,
9-(3-diethylaminopropyl)triptycene,
9-(3-di-n-butylaminopropyl)triptycene hydrochloride,
9-(3-methylaminopropyl)triptycene hydrochloride,
9-(3-aminopropyl)triptycene,
9-(3-dimethylaminopropyl)triptycene hydrochloride,
9-(4-amino-n-butyl)triptycene hydrochloride,
9-(8-n-butylaminooctyl)triptycene hydrochloride,
9-(8-di-n-butylaminooctyl)triptycene hydrochloride,
9-(12-aminododecyl)triptycene hydrochloride,
9-(13-aminotridecyl)triptycene hydrochloride,
9-(3-n-octadecylaminopropyl)triptycene hydrochloride,
9-(3-di-n-octylaminopropyl)triptycene hydrochloride,
9-(3-n-octylaminopropyl)triptycene hydrochloride,
9-($\beta$-diethylaminoethyl)triptycene hydrobromide,
9-($\beta$-di-isopropylaminoethyl)triptycene,
9-($\beta$-di-n-propylaminoethyl)triptycene salicylate,
9-(3-di-isopropylaminopropyl)triptycene phosphate,
9-(4-diethylaminobutyl)triptycene sulfate,
9-(4-di-isopropylaminobutyl)triptycene oxalate,
9-(5-dimethylaminoamyl)triptycene maleate,
9-(3-di-n-amylaminopropyl)triptycene tartrate,
9-(6-aminohexyl)triptycene,
9-(5-di-n-heptylaminoamyl)triptycene,
9-(4-di-isoamylamino-n-butyl)triptycene sulfate,
9-(7-di-isopropylamino-n-heptyl)triptycene,
9-(12-diethylaminododecyl)triptycene salicylate,
9-(13-di-n-butylaminotridecyl)triptycene tartrate,
9-(3-n-eicosylaminopropyl)triptycene hydrobromide,
9-(13-n-eicosylaminotridecyl)triptycene,
9-(8-n-tricosanylaminododecyl)triptycene,
9-(9-n-tetracosanylaminononyl)triptycene,
9-(9-n-octadecylaminooctadecyl)triptycene,
9-(9-di-n-octylaminododecyl)triptycene,
9-(8-aminooctyl)triptycene hydrochloride,
and the like.

The novel compounds of this invention have an involved and complicated ring structure, and until the present, no triptycenes having a basically substituted side chain attached at the bridgehead or 9-position of the triptycene molecule have been known. Nor have the interesting and surprising pharmacological properties of these compounds previously been appreciated.

The starting material for the synthesis of the novel compounds of this invention is conveniently prepared employing the procedure of Friedman and Logullo, J. Am. Soc., 85, 1549 (1963), for a facile generation in situ of the transitory benzyne intermediate from anthranilic acid. The benzyne so generated is allowed to react with an equimolecular amount of a suitable 9-substituted anthracene in an aprotic medium to yield a 9-substituted triptycene. Suitable aprotic solvents include benzene, acetonitrile, dioxane, methylene chloride, tetrahydrofuran, and the like. The thus-obtained 9-substituted triptycene can then be further modified by methods known to the art to yield the instant compounds.

The unique compound preferred as a point of departure for the elaboration of the multi-carbon side chain series is 9-($\beta$-carbomethoxyethyl)triptycene. The preparation of this compound can exemplify the general method of synthesis of 9-substituted triptycenes. A refluxing solution of 9-($\beta$-carbomethoxyethyl)anthracene and amyl nitrite in methylene chloride is allowed to react with a solution of anthranilic acid in acetone or tetrahydrofuran added dropwise, under which conditions the reaction goes forward rapidly, and is essentially complete when the addition is complete. The reaction product mixture is conveniently cooled and washed with dilute aqueous acid, then with saturated aqueous bicarbonate solution. The washed mixture is dried, and the solvent removed in vacuo, leaving a residue. The residue is readily recrystallized from a solvent such as boiling methanol to yield 9-($\beta$-carbomethoxyethyl)triptycene.

The resulting ester product is readily converted directly to the corresponding amide (9-triptycenepropionamide) or substituted amide by allowing the ester to react with liquid ammonia or a suitable amine in a pressure-reaction vessel. Alternatively, the conversion can be accomplished by hydrolyzing the ester to the acid, forming the acid halide, and allowing the acid halide to react with ammonia or a suitable amine. The amide or substituted amide can be readily reduced by methods known to the art to yield the desired basically substituted 9-triptycene. For example, 9-triptycene propionamide is conveniently reduced using lithium aluminum hydride in a suitable solvent, such as ether, tetrahydrofuran, a benzene-ether mixture, benzene, or the like, to yield 9-(3-aminopropyl) triptycene, which is conveniently isolated as the hydrochloric acid addition salt. Optional acids for forming addition salts include hydrobromic, sulfuric, phosphoric, salicylic, tartaric, maleic, and the like.

Triptycenes having two carbon atoms between the bridgehead position and the amine moiety are conveniently available by the following procedure. By allowing 9-triptycenepropionamide to undergo the Hofmann rearrangement, methyl N-[2-(9-triptycyl)ethyl]carbamate is readily obtained and can be easily hydrolyzed under basic conditions to yield 9-($\beta$-aminoethyl)triptycene. By the reduction of the above carbamate, using, for example, lithium aluminum hydride, in an inert organic solvent, such as ether, benzene-ether, tetrahydrofuran, or the like, 9-($\beta$-methylaminoethyl)triptycene is conveniently obtained. This compound, in turn, on being allowed to react with a mixture of formaldehyde and formic acid at reflux temperature, yields 9-($\beta$-dimethylaminoethyl)triptycene.

In order to lengthen the carbon chain to four carbon atoms, 9-($\beta$-carbomethoxyethyl)triptycene can be reduced to the corresponding alcohol by the use of lithium aluminum hydride in the same manner as previously described. The 9-(3-hydroxypropyl)triptycene obtained is allowed to react with p-toluenesulfonyl chloride to form the tosyl derivatives. A mixture of the 9-(3-tosyloxypropyl)triptycene and sodium cyanide is allowed to react in a suitable solvent such as dimethyl sulfoxide, ethylene glycol, diglyme, dimethylformamide, tetramethylurea, Cellosolve, or the like, to yield 9-(3-cyanopropyl)triptycene, which can be reduced by methods well known in the art to yield 9-(4-aminobutyl)triptycene.

Lengthening of the carbon side chain attached at position 9 of the triptycene molecule by more than one carbon atom at a time can be conveniently accomplished by employing the morpholine enamine of cyclopentanone [prepared according to the procedure of Hünig and Lendle, Ber., 93, 909 (1960)].

As an example, triptycene-9-propionyl chloride is allowed to react with the morpholine enamine of cyclopentanone in chloroform to yield 2-($\beta$-9-triptycenepropionyl)cyclopentanone. This compound can be hydrolyzed by heating in a solution of sodium hydroxide in 50 percent aqueous ethanol for a period of from about one to about six hours, preferably about 4 hours. The reaction product mixture is acidified with concentrated aqueous acid, and most of the ethanol removed in vacuo. The water-insoluble 5-($\beta$-9-triptycylpropionyl)valeric acid is filtered off and reduced by the Wolff-Kischner method to yield 8-(9-triptycyl)octanoic acid. The preparation of the amide of this acid can then be carried out by procedures analogous to those previously described and the amide obtained thereby reduced to the desired amine, in this case, 9-(8-aminooctyl)triptycene.

A further extension of the carbon chain in position 9 of the triptycene molecule can be accomplished by allowing 8-(9-triptycyl)octanoic acid halide to react with the morpholine enamine of cyclopentanone to yield 2-($\omega$-9-triptyceneoctanoyl)cyclopentanone which can be hydrolyzed as described above to yield the ketoacid, 13-(9-triptycyl)-6-ketotridecanoic acid. By reducing the ketotridecanoic acid via a Wolff-Kischner reaction in the manner described previously, 13-(9-triptycyl)tridecanoic acid can be obtained. It can be readily converted to the acid halide, amidated, and the amide reduced to yield 9-(13-aminotridecyl)triptycene.

By subjecting 13-(9-triptycyl)tridecanoic acid amide to the Hofmann rearrangement to form methyl N-[12-(9-triptycyl)dodecyl]carbamate, and hydrolyzing the carbamate, 9-(12-aminododecyl)triptycene can be prepared.

The esters, acids, acid halides, amides, and nitriles which are useful as intermediates in the synthesis of the novel triptycenes having basically substituted side chains at the bridgehead position are conveniently represented by the following Formula II,

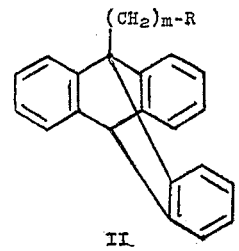

wherein R can be hydroxyl, cyano,

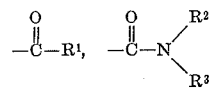

or

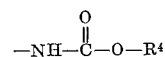

$R^1$ can be halogen, hydroxyl, or $C_1$–$C_3$ alkyloxy; $R^2$ and $R^3$ can be hydrogen or $C_1$–$C_{24}$ alkyl; $R^4$ can be $C_1$–$C_3$ alkyl; and $m$ is a number from 2 to 18.

In the above formula, halogen can be chlorine, bromine, or iodine.

The $C_1$–$C_3$ alkyl is exemplified by methyl, ethyl, n-propyl, and isopropyl. When $R^2$ and $R^3$ are $C_1$–$C_{24}$ alkyl, they have the same meaning as listed hereinabove for Formula I.

Compounds coming within the scope of Formula II, supra, include

N,N-diethyl-9-triptycenepropionamide,
9-triptycenepropionamide,
N-methyl-9-triptycenepropionamide,
N,N-dimethyl-9-triptycene-propionamide,
8-(9-triptycyl)octanoic acid amide,
13-(9-triptycyl)-tridecanoic acid amide,
N,N-di-n-butyl-9-triptycenepropionamide,
N-n-butyl-8-(9-triptycyl)octanoic acid amide,
N,N-di-n-butyl-8-(9-triptycyl)octanoic acid amide,
N,N-di-n-octyl-9-triptycenepropionamide,
N-n-octadecyl-9-triptycenepropionamide,
N-n-octyl-9-triptycenepropionamide,
9-($\beta$-carbomethoxyethyl)triptycene,
triptycene-9-propionyl chloride,
methyl N-[2-(9-triptycyl)ethyl]carbamate,
9-(3-hydroxypropyl)triptycene,
9-(3-cyanopropyl)triptycene,
8-(9-triptycyl)octanoic acid,
13-(9-triptycyl)tridecanoic acid,
methyl N-[12-(9-triptycyl)dodecyl]carbamate, and the like.

The following preparations and operating examples are illustrative of the techniques and compositions to which the present invention invention relates.

EXAMPLE 1

9-(3-DIETHYLAMINOPROPYL)TRIPTYCENE 9-($\beta$-carbomethoxyethyl)anthracene.—A solution of 133 g. of 9-($\beta$-carboxyethyl)anthracene [prepared according to the procedure of Daub and Doyle, J. Am. Chem. Soc., 74, 4449 (1952)] in 4.5 l. of methanol was saturated with dry hydrogen chloride gas while the temperature of the reaction mixture was maintained below 25° C. by careful cooling; and after complete saturation was achieved, the solution was allowed to react at 25° C. overnight. The reaction product mixture was concentrated to dryness in vacuo, and the solid residue was recrystallized from methanol to yield 9-(β-carbomethoxyethyl)anthracene as a solid having a melting point of about 65° C. and weighing about 132 g. (94 percent of theory).

*Analysis.*—Calcd: C, 81.79; H, 6.10. Found: C, 81.94; H, 5.99.

*9 - (β - carbomethoxyethyl)triptycene.*—A solution formed by dissolving 157.5 g. of 9-(β-carbomethoxyethyl) anthracene and 138 ml. of amyl nitrite in 1500 ml. of methylene chloride was added dropwise during a period of four hours to a stirred and refluxing solution of 118.5 g. of anthranilic acid in 600 ml. of acetone. When the addition was complete, the reaction mixture was refluxed for an additional 15 minutes, and then cooled to room temperature. The cooled reaction product mixture was washed twice with 250 ml. dilute (10 percent) aqueous hydrochloric acid solution and twice with 250 ml. saturated aqueous sodium bicarbonate solution to remove undesired impurities and unreacted starting materials. The washed organic solution was dried and concentrated to dryness in vacuo, leaving a residue which was recrystallized from methanol to yield 9-(β-carbomethoxyethyl)-triptycene as a solid having a melting point of about 156–158° C. and weighing about 108 g. (53 percent of theory).

*Analysis.*—Calcd: C, 84.68; H, 5.92. Found: C, 84.60; H, 5.94.

*9-(β-carboxyethyl)triptycene.*—Five grams of 9-(β-carbomethoxyethyl)triptycene were hydrolyzed by refluxing for 2 hours with a mixture of 2.2 g. of sodium hydroxide, 17 ml. of water, and 85 ml. of methanol. The solvents were distilled from the reaction product mixture in vacuo, leaving a residue which contained the sodium salt of the desired product. The residue was dissolved in about 50 ml. of water, forming a basic solution. Concentrated hydrochloric acid was added until the solution tested acid to Hydrion paper and caused a solid to precipitate. The solid was filtered off, washed throughly with water, and dried. It had a melting point of about 204.5–208° C. and was identified by analysis as 9-(β-carboxyethyl)triptycene. Weight: 4.8 g. (100 percent of theory).

*Analysis.*—Calcd: C, 84.05; H, 5.77. Found: C, 84.32; H, 5.71.

*Triptycene-9-propionyl chloride.*—A mixture of 21.2 g. of 9-(β-carboxyethyl)triptycene in 300 ml. of dry benzene was prepared and 16.75 ml. of oxalyl chloride was added thereto in one portion. The reaction mixture was refluxed and stirred for one hour. The reaction product mixture was concentrated in vacuo, leaving a solid residue. The residue was recrystallized by dissolving it in the minimum amount of toluene and adding petroleum ether to the point of incipient crystallization and cooling to yield triptycene-9-propionyl chloride as a solid having a melting point of about 168–172° C., and weighing about 16.3 g. (73 percent of theory).

*Analysis.*—Calcd: Cl, 10.28. Found: Cl, 10.14.

*N,N-diethyl-9-triptycenepropionamide.*—To 6.3 g. of triptycene-9-propionyl chloride dissolved in 90 ml. of benzene were added 4.02 g. of diethylamine, and the mixture was refluxed for about one hour. The reaction product mixture was cooled, washed successively with 50 ml. of water, 50 ml. of dilute aqueous hydrochloric acid solution, and 50 ml. of dilute aqueous sodium bicarbonate solution, and dried over magnesium sulfate. The solvent was evaporated in vacuo to leave a residue, which was recrystallized from methanol to yield N,N-dimethyl-9-triptycenepropionamide as a solid weighing about 6.26 g. (89 percent of theory) and having a melting point of about 176–178° C. A sample was recrystallized from methanol for analysis and had a melting point of about 178–179° C.

*Analysis.*—Calcd: C, 85.00; H, 7.13; N, 3.67. Found: C, 85.25; H, 7.24; N, 3.62.

*9-(3-diethylaminopropyl)triptycene hydrochloride.*—To a solution of 4 g. of lithium aluminum hydride in 70 ml. of tetrahydrofuran was added a solution of 4 g. of N,N-diethyl-9-triptycenepropionamide in 100 ml. of tetrahydrofuran dropwise with stirring during 30 minutes. The reaction mixture was stirred at ambient room temperature for about one hour and then refluxed and stirred for about 45 minutes. The reaction product mixture was cooled, and to it was added a mixture of 27.0 ml. of water and 40 ml. of tetrahydrofuran to decompose unreacted lithium aluminum hydride. The organic layer was decanted from a viscous sludge which had been produced in the reaction, and the sludge was extracted with benzene. The benzene extract was combined with the original organic layer, and the total organic solution was evaporated to dryness in vacuo. The solid residue obtained thereby was dissolved in 75 ml. of benzene and the benzene solution saturated with dry hydrogen chloride gas, thereby precipitating 9-(3-diethylaminopropyl)triptycene hydrochloride, which was filtered off. The product had a melting point of about 204–213° C. after recrystallization from a mixture of methanol and ether. It weighed 3.75 g. (81.5 percent of theory).

*Analysis.*—Calcd: N, 3.47. Found: N, 3.30.

The free base was obtained from 3 g. of the hydrochloride salt in the usual manner and found to have a melting point of about 117–119° C. after recrystallization from a mixture of ether and petroleum ether. It weighed 2.06 g.

*Analysis.*—Calcd: C, 88.23; H, 7.95; N, 3.81. Found: C, 87.76; H, 7.91; N, 3.40.

EXAMPLE 2

9-(3-AMINOPROPYL)TRIPTYCENE

*9-triptycenepropionamide.*—Five grams of 9-(β-carbomethoxyethyl)triptycene were dissolved in a mixture of 50 ml. of methanol and 100 ml. of liquid ammonia and heated for 18 hours at 100° C. in a sealed pressure-reaction vessel. The reaction vessel was cooled to room temperature, and the reaction product mixture was removed and evaporated to dryness in vacuo, leaving a residue. The residue was recrystallized from aqueous methanol to yield 9-triptycenepropionamide as a solid having a melting point of about 265–267° C. and weighing about 3.92 g. (82 percent of theory).

*Analysis.*—Calcd: C, 84.89; H, 5.89; N, 4.30. Found: C, 85.02; H, 5.95; N, 4.27.

*9-(3-aminoproypl)triptycene hydrochloride.*—To a solution of 2 g. of lithium aluminum hydride in 35 ml. of dry tetrahydrofuran was added a solution of 2 g. of 9-triptycenepropionamide in 50 ml. of dry tetrahydrofuran dropwise with stirring during 30 minutes. The reaction mixture was stirred at ambient room temperature for about one hour and then refluxed and stirred for about 45 minutes. The reaction product mixture was cooled and to it was added a mixture of 13.5 ml. of water and 20 ml. of tetrahydrofuran to decompose unreacted lithium aluminum hydride. The organic layer was decanted from a viscous sludge which had been produced in the reaction, and the sludge was extracted with benzene. The benzene extract was combined with the original organic layer, and the total organic solution was evaporated to dryness in vacuo. The solid residue obtained thereby was dissolved in 75 ml. of benzene and the benzene solution saturated with dry hydrogen chloride gas, thereby precipitating 9-(3-aminopropyl)triptycene hydrochloride, which was filtered off. The product had a melting point of about 295–300° C. after recrystallization from a mixture of methyl Cellosolve and ether. It weighed 1.38 g. (61.6 percent of theory).

*Analysis.*—Calcd: C, 79.40; H, 6.37; N, 4.03. Found: C, 79.47; H, 6.88; N, 3.88.

The free base 9-(3-aminopropyl)triptycene was prepared by neutralizing an aqueous solution of 9-(3-aminopropyl)triptycene hydrochloride with an aqueous sodium hydroxide solution, and extracting the free base with ether. The ether solution was concentrated in vacuo and the residue recrystallized from ethanol-ether to yield 9-(3-aminopropyl)triptycene having a melting point of about 196–197° C.

*Analysis.*—Calcd: C, 88.70; H, 6.80; N, 4.50. Found: C, 88.77; H, 6.82; N, 4.36.

EXAMPLE 3

9-(3-METHYLAMINOPROPYL)TRIPTYCENE HYDROCHLORIDE

*N-methyl - 9 - triptycenepropionamide.*—Following the procedure of Example 2 first paragraph, but using 1 g. of 9-(β-carbomethoxyethyl)triptycene, 25 ml. of methanol, and 25 ml. of anhydrous methylamine as reactants, N-methyl-9-triptycenepropionamide was obtained as a solid having a melting point of about 247.5–249° C. after recrystallization from a mixture of methyl Cellosolve and ether. It weighed 0.81 g. (81 percent of theory).

*Analysis.*—Calcd: C, 84.92; H, 6.24; N, 4.13. Found: C, 84.60; H, 6.18; N, 4.12.

*9 - (3 - methylaminopropyl)triptycene hydrochloride.*— Following the procedure of Example 2 second paragraph, 2 g. of N-methyl-9-triptycenepropionamide dissolved in 50 ml. of dry tetrahydrofuran were reduced with 2 g. of lithium aluminum hydride in 35 ml. of dry tetrahydrofuran, and 9-(3-methylaminopropyl)-triptycene was obtained in the form of its hydrochloride salt having a melting point of about 334–336° C. and weighing about 2.08 g. (97 percent of theory).

*Analysis.*—Calcd: C, 79.64; H, 6.68; N, 3.87. Found: C, 79.43; H, 6.75; N, 3.84.

EXAMPLE 4

9-(3-DIMETHYLAMINOPROPYL)TRIPTYCENE HYDROCHLORIDE

*N,N-dimethyl - 9 - triptycenepropionamide.*—Following the procedure of Example 2, first paragraph, but using 2 g. of 9-(β-carbomethoxyethyl)triptycene, 50 ml. of methanol, and 50 ml. of dimethylamine as reactants, N,N-dimethyl-9-triptycenepropionamide was obtained as a solid having a melting point of about 219–221° C. after recrystallization from a mixture of benzene and petroleum ether. It weighed 0.86 g. (41 percent of theory).

*Analysis.*—Calcd: C, 84.95; H, 6.56; N, 3.96. Found: C, 84.99; H, 6.75; N, 3.78.

*9-(3-dimethylaminopropyl)triptycene hydrochloride.*— Following the procedure of Example 2 second paragraph, 2 g. of N,N-dimethyl-9-triptycenepropionamide dissolved in 50 ml. of dry tetrahydrofuran were reduced with 2 g. of lithium aluminum hydride dissolved in 35 ml. of dry tetrahydrofuran, and 9 - (3-dimethylaminopropyl)triptycene was obtained in the form of its hydrochloride salt having a melting point of about 285–314° C. after recrystallization from a mixture of methyl Cellosolve and ether. It weighed 1.42 g. (67 percent of theory).

*Analysis.*—Calcd: C, 79.87; H, 6.97; N, 3.73. Found: C, 79.97; H, 7.08; N 3.49.

EXAMPLE 5

9-(β-AMINOETHYL)TRIPTYCENE

*Methyl N - [2 - (9 - triptycyl)ethyl]carbamate.*—Four grams of 9-triptycenepropionamide were dissolved in a mixture of 40 ml. of methanol and 40 ml. of tetrahydrofuran and the solution was added to 57 ml. of a 0.435 molar solution of sodium methoxide in methanol. The mixture was stirred, and 20 ml. of a 0.625 molar solution of bromine in methanol were added dropwise. The reaction mixture was then refluxed for about one and three-quarters hours. The reaction product mixture was evaporated to dryness to remove all solvent, and about 40 ml. of water were added to the residue. The water-insoluble material was filtered off, washed with about 10 ml. of methanol, and recrystallized from toluene to yield methyl N-[2-(9-triptycyl)ethyl]carbamate as a solid having a melting point of about 243–248.5° C. and weighing about 2.47 g. (56 percent of theory).

*Analysis.*—Calcd: C, 81.10; H, 5.96; N, 3.94. Found: C, 81.01; H, 5.91; N, 3.98.

*9-(β-aminoethyl)triptycene hydrochloride.*—A mixture composed of 2.5 g. of methyl N-[2-(9-triptycyl)ethyl] carbamate, 1.23 g. of potassium hydroxide, 75 ml. of ethylene glycol, and 5 ml. of water was refluxed gently for about 2 hours. The reaction product mixture was worked up by distilling off a portion of the solvent in vacuo and diluting the material remaining with about 50 ml. of water. The solid material which separated from the mixture was filtered off, washed with about 10 ml. of water, and recrystallized from a mixture of dimethylformamide and water to yield 9-(β-aminoethyl)triptycene as a solid having a melting point of about 193–194.5° C.

*Anaylsis.*—Calcd: C, 88.85; H, 6.44; N, 4.71. Found: C, 88.61; H, 6.51; N, 4.52.

The hydrochloride was prepared by dissolving the free base, 9-(β-aminoethyl)triptycene, in about 100 ml. of ether and saturating the ether solution with dry hydrogen chloride gas. The solid which separated was filtered off and recrystallized from a mixture of methyl Cellosolve and ether to yield 9-(β-aminoethyl)triptycene hydrochloride as a solid having a melting point of about 342–349° C.

*Analysis.*—Calcd: C, 79.14; H, 6.03. Found: C, 78.03; H, 6.68.

EXAMPLE 6

9-(β-METHYLAMINOETHYL)TRIPTYCENE

*9-(β-methylaminoethyl)triptycene hydrochloride.*—Following the procedure of Example 2, second paragraph, 2 g. of methyl N-[2-(9-triptycyl)ethyl]carbamate dissolved in about 50 ml. of dry tetrahydrofuran were reduced with 2 g. of lithium aluminum hydride dissolved in 35 ml. of dry tetrahydrofuran, and 9-(β-methylaminoethyl)triptycene was obtained in the form of its hydrochloride salt having a melting point above 350° C. and weighing 1.37 g. (70 percent of theory).

*Analysis.*—Calcd: C, 79.40; H, 6.37; N, 4.03. Found: C, 79.50; H, 6.51; N, 3.84.

The free base, 9-(β-methylaminoethyl)triptycene, was prepared by neutralizing an aqueous solution of the corresponding hydrochloride salt with aqueous sodium hydroxide solution and extracting the free base with ether. The ether solution was stripped, and the resulting residue was recrystallized from aqueous methanol to yield 9-(β-methylaminoethyl)triptycene having a melting point of about 161–168° C. and weighing about 1.09 g. (72 percent of theory).

*Analysis.*—Calcd: C, 88.10; H, 6.80; N, 4.50. Found: C, 88.07; H, 7.00; N, 4.27.

EXAMPLE 7

9-(β-DIMETHYLAMINOETHYL)TRIPTYCENE HYDROCHLORIDE

A mixture of 1 g. of 9-(β-methylaminoethyl)triptycene, 10 ml. of toluene, 0.3 ml. of 37 percent aqueous formaldehyde, and 0.15 ml. of 98 percent formic acid was heated to refluxing for about one hour. The reaction product mixture was evaporated to dryness in vacuo. The residue obtained was dissolved in 100 ml. of ether, the ether solution washed with about 30 ml. of aqueous sodium bicarbonate solution, and the washings were discarded. The ether solution was dried and saturated with anhydrous gaseous hydrogen chloride. The solid which precipitated was filtered off and recrystallized from a mixture of methanol and ether to yield 9-(β-dimethylaminoethyl)triptycene hydrochloride as a solid having a melting point of about 345–349° C. and weighing 0.98 g. (85 percent of theory).

*Analysis.*—Calcd: C, 79.64; H, 6.68; N, 3.87. Found: C, 79.39; H, 6.90; N, 3.82.

EXAMPLE 8

9-(4-AMINOBUTYL)TRIPTYCENE HYDROCHLORIDE

*9-(3-hydroxypropyl)triptycene.*—To a mixture of 10 g. of lithium aluminum hydride in 450 ml. of anhydrous ether was added with stirring a solution of 15 g. of 9-(β-carbomethoxyethyl)triptycene in 150 ml. of benzene. The reaction mixture was stirred and refluxed for about one hour and cooled to room temperature. The unreacted lithium aluminum hydride was decomposed by adding 60 ml. of ethyl acetate and 300 ml. of 10 percent aqueous hydrochloric acid to the cooled reaction product mixture. The aqueous layer was separated and discarded. The organic layer was washed with about 150 ml. of 10 percent aqueous hydrochloric acid, then with 150 ml. of aqueous sodium bicarbonate solution, and dried over magnesium sulfate. The solvent was distilled in vacuo, and the residue which remained was triturated under about 50 ml. of petroleum ether. The solid material was filtered off and found to have a melting point of about 196–199° C. It was confirmed by analysis and infrared and ultraviolet absorption spectra as 9-(3-hydroxypropyl) triptycene. It weighed 13.1 g. (95 percent of theory).

*Analysis.*—Calcd: C, 88.42; H, 6.45. Found: C, 88.26; H, 6.46.

*9-(3-tosyloxypropyl)triptycene.*—To a solution of 7.8 g. of 9-(3-hydroxypropyl)triptycene in 20 ml. of dry pyridine cooled to about 5° C. were added 5.25 g. of p-toluenesulfonyl chloride with stirring. The cooling bath was removed, and the reaction mixture was stirred for about 3 hours at about ambient room temperature. The reaction product mixture was poured into a mixture of 50 ml. of concentrated hydrochloric acid and a large excess of crushed ice. The solid material which separated was filtered off, washed with about 50 ml. of water, dried, and recrystallized from a mixture of ethylene dichloride and ether to yield 9-(3-tosyloxypropyl)triptycene having a melting point of about 220–222° C. and weighing 7.05 g. (61 percent of theory).

*Analysis.*—Calcd: S, 6.87. Found: S, 6.99.

*9-(3-cyanopropyl)triptycene.*—A mixture of 7.0 g. of 9-(3-tosyloxypropyl)triptycene, 2 g. of dry sodium cyanide powder, and 30 ml. of dimethyl sulfoxide was stirred and heated to about 140° C. in 3 minutes and held at that temperature for about 10 minutes. The reaction product mixture was cooled and poured into about 250 ml. of ice water. The solid material which separated was filtered off, washed with about 50 ml. of cold water, dried, and recrystallized from a mixture of dimethylformamide and water to yield 9-(3-cyanopropyl)triptycene as a solid having a melting point of about 218–221° C. and weighing 4.72 g. (98 percent of theory).

*Analysis.*—Calcd: C, 89.68; H, 5.96; N, 4.36. Found: C, 89.68; H, 6.01; N, 4.23.

*9-(4-aminobutyl)triptycene hydrochloride.*—Following the procedure of Example 2, second paragraph, 4.72 g. of 9-(3-cyanopropyl)triptycene dissolved in about 100 ml. of a mixture of 1:1 benzene and ether were reduced with 6.0 g. of lithium aluminum hydride dissolved in 100 ml. of ether, and 9-(4-aminobutyl)triptycene was obtained in the form of its hydrochloric salt having a melting point of about 290° C. after recrystallization from a mixture of methanol and benzene. It weighed 4.16 g. (78 percent of theory).

*Analysis.*—Calcd: Cl, 9.80; N, 3.87. Found: Cl, 9.99; N, 3.59.

EXAMPLE 9

9-(8-AMINOOCTYL)TRIPTYCENE HYDROCHLORIDE

*2-(β-9-triptycylpropionyl)cyclopentanone.*—To a solution of 7.5 g. of the morpholine enamine of cyclopentanone [prepared according to the procedure of Hünig and Lendle, Ber., 93, 909 (1960)] and 5.1 g. of triethylamine in 50 ml. of dry chloroform was added with stirring a solution of 16.3 g. of triptycene-9-propionyl chloride in 50 ml. of dry chloroform. The temperature of the reaction mixture rose to about 35–40° C., and the mixture was then stirred for about 30 minutes at about 35–38° C. The reaction product mixture was allowed to stand overnight at ambient room temperature. Twenty-five ml. of aqueous 6 N hydrochloric acid were added, and the reaction mixture was stirred at about 35–42° C. for about 30 minutes. The aqueous layer was separated from the chloroform layer and discarded. The chloroform layer was washed with 100 ml. of water and the washings discarded. The chloroform solvent was distilled in vacuo, leaving a residue which was recrystallized from a mixture of ether and petroleum ether to yield 2-(β-9-triptycylpropionyl)cyclopentanone having a melting point of about 193–203° C. and weighing about 8.5 g. (46 percent of theory). A sample for analysis was recrystallized from a mixture of ethylene dichloride, ether, and petroleum ether to a melting point of about 206–209° C.

*Analysis.*—Calcd: C, 85.68; H, 6.16. Found: C, 85.56; H, 6.31.

*5-(β-9-triptycylpropionyl)valeric acid.*—A solution of 7.85 g. of 2-(β-9-triptycylpropionyl)cyclopentanone and 0.95 g. of sodium hydroxide in 100 ml. of 50 percent aqueous ethanol was refluxed for about 4 hours. The reaction product mixture was acidified with 2.5 ml. of concentrated hydrochloric acid and most of the ethanol was distilled off in vacuo. The water-insoluble material obtained thereby was filtered off and washed with 25 ml. of water. It weighed 7.5 g. (91 percent of theory), had a melting point of about 193–197° C., and was identified by analysis as 5-(β-9-triptycylpropionyl)valeric acid. A sample recrystallized from toluene for analysis had a melting point of about 201–203° C.

*Analysis.*—Calcd: C, 81.92; H, 6.38. Found: C, 82.28; H, 6.45.

*8-(9-triptycyl)octanoic acid.*—A mixture of 7.3 g. of 5-(β-9-triptycylpropionyl)valeric acid, 1.05 g. of potassium hydroxide, 7.5 ml. of 85 percent hydrazine hydrate and 20 ml. of diethylene glycol was stirred and refluxed for about 6 hours. At the end of this time, 20 ml. of diethylene glycol and 5.5 g. of potassium hydroxide were added, and the reaction mixture was heated for about 17 hours in an open flask in an oil bath held at a temperature of about 195° C. The reaction product mixture was poured into a large volume of water, 20 ml. of 12 N aqueous hydrochloric acid were added, and the mixture was heated almost to boiling. The mixture was then cooled and the solid material filtered off and washed well with a total of 100 ml. of water. It weighed 6.7 g. (95 percent of theory), and had a melting point of about 160–168° C. It was identified by its infrared spectrum as 8-(9-triptycyl)octanoic acid. A sample was recrystallized for analysis from a mixture of methanol and ethyl ether and had a melting point of 175–178° C.

*Analysis.*—Calcd: C, 84.81; H, 7.12. Found: C, 84.45; H, 7.11.

*8-(9-triptycyl)octanoic acid amide.*—Following the procedure of Example 1, fourth paragraph, but using 4.47 g. of 8-(9-triptycyl)octanoic acid dissolved in 100 ml. of dry benzene and 2.9 ml. of oxalyl chloride as reactants, 8-(9-triptycyl)octanoyl chloride was obtained. It was used crude and was allowed to react with excess dry ammonia in ether solution. The solid which formed was filtered off and recrystallized from a mixture of benzene and petroleum ether to yield 8-(9-triptycyl)octanoic acid amide having a melting point of about 167–169° C. and weighing 3.4 g. (76 percent of theory, based on weight of acid used).

*Analysis.*—Calcd: C, 85.02; H, 7.39; N, 3.54. Found: C, 84.83; H, 7.38; N, 3.53.

9-(8-aminooctyl)triptycene hydrochloride.—Following the procedure of Example 2, second paragraph, 3.20 g. of the 8-(9-triptycyl)octanoic acid amide dissolved in 100 ml. of a 1:1 mixture of benzene and ether were reduced with 3.20 g. of lithium aluminum hydride dissolved in 50 ml. of ether, and 9-(8-aminooctyl)triptycene was obtained in the form of its hydrochloride salt having a melting point of about 233–235° C. after recrystallization from a mixture of ethanol and ether. It weighed 2.08 g. (62 percent of theory).

Analysis.—Calcd: C, 80.44; H, 7.71; N, 3.35. Found: C, 79.66; H, 7.76; N, 3.05.

EXAMPLE 10

9-(13-AMINOTRIDECYL)TRIPTYCENE HYDROCHLORIDE 2-(ω-9-triptyceneoctanoyl)cyclopentanone.—Following the general procedure of Example 9, first paragraph, a solution of 92.4 g. of 8-(9-triptycyl)octanoyl chloride in 325 ml. of dry chloroform was added dropwise with stirring to a solution of 35.8 g. of the morpholine enamine of cyclopentanone and 24.1 g. of triethylamine in 325 ml. of dry chloroform. The temperature of the reaction mixture rose to about 48° C., and the mixture was warmed to about 63° C. and stirred for about 30 minutes at that temperature. The reaction product mixture was then cooled to about 40° C., 128 ml. of aqueous 6 N hydrochloric acid were added and the reaction mixture stirred at about 50° C. for about 30 minutes. The aqueous layer was separated from the chloroform layer and discarded. The chloroform layer was washed with about 250 ml. of water and with an equal volume of dilute aqueous sodium bicarbonate solution and the washings discarded. The chloroform solution was concentrated in vacuo, leaving a residue which weighed 71.2 g. and which was used without further purification in the next step.

13-(9-triptycyl)-6-ketotridecanoic acid.—Following the general procedure of Example 9, second paragraph, the 2-(ω-9-triptycyloctanoyl)cyclopentanone was dissolved in 500 ml. of ethanol and hydrolyzed by refluxing for about 4 hours with 7.35 g. of sodium hydroxide dissolved in 200 ml. of water. The reaction product mixture was acidified with about 50 ml. of concentrated hydrochloric acid and most of the ethanol was distilled off in vacuo. The water-insoluble material obtained thereby was filtered off and washed with about 50 ml. of water. The solid was recrystallized from a mixture of toluene and ether to yield 30 g. (28 percent of theory) of 13-(9-triptycyl)-6-ketotridecanoic acid having a melting point of about 153–154° C.

Analysis.—Calcd: C, 82.46; H, 7.55. Found: C, 82.20; H, 7.58.

13-(9-triptycyl)tridecanoic acid.—A mixture of 6.95 g. of 13-(9-triptycyl)-6-ketotridecanoic acid, 0.85 g. of potassium hydroxide, 6.1 ml. of 85 percent hydrazine hydrate, and 16.25 g. of diethylene glycol was stirred and refluxed for about 6 hours. At the end of this time, 16.25 g. of diethylene glcol and 4.46 g. of potassium hydroxide were added, and the reaction mixture was heated for about 17 hours in an open flask in an oil bath held at a temperature of about 195° C. The reaction product mixture was poured into a large volume of water, 15 ml. of 12 N aqueous hydrochloric acid were added, and the mixture was extracted with about 150 ml. of methylene dichloride. The methylene dichloride solution was washed with about 50 ml. of water, dried over anhydrous magnesium sulfate, and the solvent removed in vacuo, leaving a glass-like residue which weighed 4.61 g. and which was identified by the infrared spectrum as 13-(9-triptycyl)tridecanoic acid.

13-(9-triptycyl)tridecanoic acid amide.—Following the procedure of Example 1, fourth paragraph, but using 4.61 g. of 13-(9-triptycyl)tridecanoic acid dissolved in 50 ml. of dry benzene and 5 ml. of oxalyl chloride as reactants, 13-(9-triptycyl)tridecanoyl chloride was obtained. The crude acid chloride obtained by concentrating the reaction product mixture in vacuo was dissolved in 50 ml. of dry ether and allowed to react with 50 ml. of liquid ammonia for about one-half hour. The reaction product mixture was concentrated to dryness in vacuo and the residue extracted with methylene chloride, the extract washed with about 50 ml. of water, and the water washing discarded. The organic solution was dried over anhydrous magnesium sulfate and evaporated in vacuo, leaving a glass-like residue which was recrystallized from a mixture of benzene and petroleum ether to yield 13-(9-triptycyl)tridecanoic acid as a solid weighing about 3.17 g. A sample for analysis had a melting point of about 117–121° C. after drying in vacuo at 100° C.

Analysis.—Calcd: N, 3.01. Found: N, 2.82.

9-(13-aminotridecyl)triptycene hydrochloride.—Following the general procedure of Example 2, second paragraph, 2.65 g. of 13-(9-triptycyl)tridecanoic acid amide dissolved in a mixture of 30 ml. of dry benzene and 30 ml. of dry ether were reduced with a solution of 3 g. of lithium aluminum hydride dissolved in a mixture of 100 ml. of dry ether and 80 ml. of dry benzene, and 9-(13-aminotridecyl)triptycene was obtained in the form of its hydrochloride salt having a melting point of about 160–162° C. after recrystallization from a mixture of methanol and ether. It weighed about 2.47 g. (88 percent of theory).

Analysis.—Calcd: Cl, 7.26; N, 2.86. Found: Cl, 7.26; N, 2.83.

EXAMPLE 11

9-(12-AMINODODECYL)TRIPTYCENE HYDROCHLORIDE

Methyl N-[12-(9-triptycyl)dodecyl]carbamate.—To a solution of 4.0 g. of 13-(9-triptycyl)tridecanoic acid amide in a mixture composed of 40 ml. of dry tetrahydrofuran and 40 ml. of methanol was added 44.9 ml. of a 0.382 molar solution of sodium in methanol followed by the dropwise addition during 15 minutes of 13.3 ml. of a 0.644 molar solution of bromine in methanol and the reaction mixture heated to refluxing for 1.5 hours. The reaction product mixture was evaporated to dryness in vacuo, leaving a residue which was dissolved in about 50 ml. of ether and washed twice with equal volumes of water. The ethereal solution was dried over anhydrous magnesium sulfate and concentrated in vacuo, leaving a glass-like residue which was identified by its infrared and NMR spectra as methyl N-[12-(9-triptycyl)dodecyl]carbamate. It was used without further purification in the succeeding step.

9-(12-aminododecyl)triptycene hydrochloride.—The crude carbamate thus prepared was hydrolyzed by refluxing for about 3 hours with a mixture of 75 ml. of ethylene glycol, 5 ml. of water, and 2.0 g. of potassium hydroxide. The reaction product mixture was cooled and diluted with about an equal volume of water and extracted twice with equal volumes of ether and the water layer discarded. The combined ether extracts were washed twice with equal volumes of water and dried over anhydrous potassium hydroxide. The dry ethereal solution was saturated with dry gaseous hydrogen chloride and the solvent removed in vacuo, leaving a residue. The residue was recrystallized from a mixture of ethanol and ether to yield 9-(12-aminododecyl)triptycene hydrochloride having a melting point of about 163–165° C. and weighing about 1.04 g.

Analysis.—Calcd: Cl, 7.48; N, 2.95. Found: Cl, 7.38; N, 2.91.

EXAMPLE 12

9-(β-AMINO-α-HYDROXYETHYL)TRIPTYCENE HYDROCHLORIDE

Triptycene-9-carboxaldehyde ethylene acetal.—To a stirred and refluxing solution of 122.5 g. of anthracene-9-carboxaldehyde ethylene acetal [prepared by the method of Rio and Sillion, Compt. rend., 244, 625 (1957)] in 1,225 ml. of dioxane were added simultaneously during six hours from separate dropping funnels, solutions of 73.5 g. of anthranilic acid in 2,450 ml. of dioxane, and 78.3 g. of amyl nitrite in 2,450 ml. of dioxane. The reaction mixture was refluxed for an additional 30 minutes, after which the solvent was removed in vacuo to leave a residue. The residue was recrystallized from a mixture of dimethylformamide and methanol to yield triptycene-9-carboxaldehyde ethylene acetal as a solid having a melting point of about 284–285° C. and weighing about 85.5 g. (54 percent of theory).

*Analysis.*—Calcd: C, 84.64; H, 5.56. Found: C, 84.42; H, 5.58.

*Triptycene-9-carboxaldehyde.*—A solution of 77.5 g. of the ethylene acetal in 3,880 ml. of glacial acetic acid, 1,000 ml. of water, and 775 ml. of concentrated hydrochloric acid was refluxed for about 2 hours. The reaction product mixture was cooled to about −5° C. The solid material which separated was filtered off and washed successively with 150 ml. portions of 50 percent aqueous acetic acid, water, and methanol, and recrystallized from a mixture of acetic acid and water to yield triptycene-9-carboxaldehyde as a solid having a melting point of about 235–238° C. and weighing about 62.5 g. (93 percent of theory).

*Analysis.*—Calcd: C, 89.33; H, 5.00. Found: C, 88.82; H, 4.99.

*Triptycene-9-carboxaldehyde cyanhydrin.*—A solution of 4 g. of the above aldehyde in 250 ml. of liquid hydrogen cyanide was cooled in an ice bath, and 16 g. of dry powdered sodium cyanide were added. The reaction mixture was stirred at about 0° C. for about 30 minutes, after which it was evaporated quickly to dryness in vacuo at a temperature below 25° C. The residue was taken up in a mixture of about 100 ml. of ethyl acetate and 250 ml. of ice water. The organic layer was separated, washed well with about 250 ml. of cold water, 100 ml. of dilute aqueous hydrochloric acid, and again with about 200 ml. of water, and dried. The dried organic solution was then concentrated under reduced pressure to a volume of about 25 ml., and 75 ml. of petroleum ether was added. The solid material which separated was filtered off and recrystallized from a mixture of ethyl acetate and petroleum ether to yield triptycene-9-carboxaldehyde cyanhydrin as a solid having a melting point of about 224–227° C. and weighing about 3.7 g. (84 percent of theory).

*Analysis.*—Calcd: C, 85.41; H, 4.89; N, 4.53. Found: C, 85.37; H, 5.01; N, 4.46.

*9-(β-amino-α-hydroxyethyl)triptycene hydrochloride.*—To a stirred and refluxing solution of 4.0 g. of lithium aluminum hydride in a mixture of 250 ml. of dry ether and 100 ml. of dry benzene, was added in 5 minutes a solution of 3.0 g. of triptycene-9-carboxaldehyde cyanhydrin in 35 ml. of pure tetrahydrofuran. Stirring and refluxing were continued for about one and one-quarter hours.

To the reaction product mixture were added 25 ml. of water dropwise and the supernatant liquid was decanted from the viscous residue and saved. The residue was extracted with two volumes of tetrahydrofuran and one volume of benzene. The extracts were combined with the supernatant liquid from above and the whole solution evaporated to dryness in vacuo to leave a crystalline residue weighing about 3.1 g. and having a melting point of about 258–268° C. This material was identified by infrared spectrum as 9-(β-amino-α-hydroxyethyl)triptycene free base.

The hydrochloride acid addition salt was prepared in ethanol and obtained as a solid having a melting point of about 325–327° C.(d.) and weighing about 1.81 g. (53 percent of theory based on cyanhydrin). Analysis showed the product contained one-half mole of water of crystallization.

*Analysis.*—Calcd: C, 73.59; H, 5.89; N, 3.90. Found: C, 73.57; H, 5.96; N, 3.75.

EXAMPLE 13

9-(3-DI-n-BUTYLAMINOPROPYL)TRIPTYCENE HYDROCHLORIDE

*N,N-di-n-butyl-9 - triptycenepropionamide.*—Following the general procedure of Example 1, fifth paragraph, to 6.3 g. of triptycene-9-propionyl chloride dissolved in 90 ml. of benzene were added 7.13 g. of di-n-butylamine, and the mixture was refluxed about one hour. The reaction product mixture was worked up as before, and N,N-di-n-butyl-9-triptycenepropionamide was obtained having a melting point of about 113–115° C. after recrystallization from methanol. It weighed 6.28 g. (78 percent of theory).

*Analysis.*—Calcd: C, 85.08; H, 8.06; N, 3.20. Found: C, 84.94; H, 8.20; N, 3.04.

*9-(3-di-n-butylaminopropyl)triptycene hydrochloride.*—Following the procedure of Example 1, sixth paragraph, 4 g. of N,N-di-n-butyl-9-triptycenepropionamide dissolved in 50 ml. of dry benzene were reduced with 4 g. of lithium aluminum hydride dissolved in a mixture of 250 ml. of dry ether and 100 ml. of dry benzene, and 9-(3-di-n-butylaminopropyl)triptycene was obtained in the form of its hydrochloride addition salt having a melting point of about 259–262° C. after recrystallization from a mixture of methanol and ether. It weighed 3.75 g. (89 percent of theory).

*Analysis.*—Calcd: N, 3.04; Cl, 7.71. Found: N, 2.87; Cl, 7.92.

EXAMPLE 14

9-(8-n-BUTYLAMINOOCTYL)TRIPTYCENE HYDROCHLORIDE

*N-n-butyl-8-(9-triptycyl)octanoic acid amide.*—Following the procedure of Example 13, first paragraph, but using 2.1 g. of 8-(9-triptycyl)octanoyl chloride dissolved in 60 ml. of benzene and 1.1 g. of n-butylamine as reactants, N-n-butyl-8-(9-triptycyl)octanoic acid amide was obtained. It was used crude in the succeeding step.

*9-(8-n-butylaminooctyl)triptycene hydrochloride.*—Following the procedure of Example 1, sixth paragraph, 2.28 g. of the N-n-butyl-8-(9-triptycyl)octanoic acid amide dissolved in 40 ml. of dry benzene were reduced with 3 g. of lithium aluminum hydride dissolved in a mixture of 125 ml. of dry ether and 50 ml. of dry benzene, and 9-(8-n-butylaminooctyl)triptycene was obtained in the form of its hydrochloride addition salt having a melting point of 227–228° C. after recrystallization from a mixture of ethanol and ether. It weighed 1.96 g. (82 percent of theory).

*Analysis.*—Calcd: C, 81.06; H, 8.51; N, 2.96. Found: C, 80.75; H, 8.73; N, 2.93.

EXAMPLE 15

9-(8-DI-n-BUTYLAMINOOCTYL)TRIPTYCENE HYDROCHLORIDE

*N,N-di-n-butyl-8-(9-triptycyl)octanoic acid amide.*—Following the procedure of Example 13, first paragraph, but using 2.1 g. of 8-(9-triptycyl)octanoyl chloride dissolved in 60 ml. of dry ether and 1.96 g. of di-n-butylamine as reactants, N,N-di-n-butyl-8-(9-triptycyl)octanoic acid amide was obtained and was used crude in the succeeding step of the reaction.

*9-(8-di-n-butylaminooctyl)triptycene hydrochloride.*—Following the procedure of Example 1, sixth paragraph, 2.56 g. of N,N-di-n-butyl-8-(9-triptycyl)octanoic acid amide dissolved in 40 ml. of dry benzene were reduced with 3.0 g. of lithium aluminum hydride dissolved in a mixture of 125 ml. of dry ether and 50 ml. of dry benzene, and 9-(8-di-n-butylaminooctyl)triptycene was obtained in the form of its hydrochloride addition salt having a melting point of about 187–188° C. and weighing 2.01 g. (75 percent of theory).

*Analysis.*—Calcd: N, 2.64; Cl, 6.69. Found: N, 2.65; Cl, 6.61.

EXAMPLE 16

9-(3-DI-n-OCTYLAMINOPROPYL)TRIPTYCENE HYDROCHLORIDE

*N,N-di-n-octyl-9 - triptycenepropionamide.*—Following the procedure of Example 13, first paragraph, but using 4.2 g. of triptycene-9-propionyl chloride dissolved in 100 ml. of dry benzene and 8.87 g. of di-n-octylamine as reactants, N,N-di-n-octyl-9-triptycenepropionamide was obtained and was used crude in the succeeding step of the reaction.

*9 - (3 - di - n - octylaminopropyl)triptycene hydrochloride.*—Following the procedure of Example 1, sixth paragraph, 6.73 g. of N,N-di-n-octyl-9-triptycylpropionamide dissolved in 60 ml. of dry benzene were reduced with 6.73 g. of lithium aluminum hydride dissolved in a mixture of 420 ml. of dry ether and 170 ml. of dry benzene, and 9-(3-di-n-octylaminopropyl)triptycene was obtained in the form of its hydrochloride addition salt, which was amorphous, and weighed 4.5 g.

*Analysis.*—Calcd: N, 2.45; Cl 6.19. Found: N, 2.22; Cl, 6.59.

EXAMPLE 17

9-(3-n-OCTADECYLAMINOPROPYL)TRIPTYCENE HYDROCHLORIDE

*N-n-octadecyl - 9 - triptycenepropionamide.*—Following the procedure of Example 13, first paragraph, but using 4.2 g. of triptycene-9-propionyl chloride dissolved in 100 ml. of dry benzene and 9.91 g. of n-octadecylamine as reactants, N-n-octadecyl-9-triptycenepropionamide was obtained, and was used directly in the succeeding step.

*9 - (3 - n - octadecylaminopropyl)triptycene hydrochloride.*—Following the procedure of Example 1, sixth paragraph, 7.08 g. of N-n-octadecyl-9-triptycenepropionamide dissolved in 75 ml. of dry benzene were reduced with 7.08 g. of lithium aluminum hydride dissolved in a mixture of 442 ml. of dry ether and 180 ml. of dry benzene, and 9-(3-n-octadecylaminopropyl)triptycene was obtained in the form of its hydrochloride addition salt having a melting point of about 163–167° C. after recrystallization from a mixture of benzene and ether. It weighed 1.47 g. (20 percent of theory).

*Analysis.*—Calcd: N, 2.33; Cl. 5.91. Found: N, 2.31; Cl, 6.04.

EXAMPLE 18

9-(3-n-OCTYLAMINOPROPYL)TRIPTYCENE HYDROCHLORIDE

*N-n-octyl-9-triptycenepropionamide.*—A mixture of 4 g. of 9-(β-carbomethoxyethyl)triptycene, 20 ml. of n-octylamine, and 2 ml. of ethylene glycol was refluxed for about 6.5 hours. The reaction product mixture was concentrated in vacuo to remove some of the amine. The remaining material was dissolved in about 250 ml. of ether and washed with four 50 ml. portions of dilute aqueous hydrochloric acid solution and once with 100 ml. of dilute aqueous sodium bicarbonate solution. A part of the solvent ether was removed in vacuo and the residual solution was allowed to stand at room temperature, whereupon a crystalline product separated which was identified as N-n-octyl-9-triptycenepropionamide. It had a melting point of about 131–133° C. and weighed 3.8 g. (74 percent of theory).

*Analysis.*—Calcd: C, 85.08; H, 8.06; N, 3.20. Found: C, 85.17; H, 8.11; N, 3.32.

*9-(3-n - octylaminopropyl)triptycene hydrochloride.*—Following the procedure of Example 1, sixth paragraph, 3.6 g. of N-n-octyl-9-triptycenepropionamide dissolved in 50 ml. of dry benzene were reduced with 3.7 g. of lithium aluminum hydride dissolved in a mixture of 230 ml. of dry ether and 90 ml. of dry benzene, and 9-(3-n-octylaminopropyl)triptycene was obtained in the form of its hydrochloride addition salt having a melting point of about 218–220° C. after recrystallization from a mixture of benzene and ether. It weighed 3.22 g. (85 percent of theory).

*Analysis.*—Calcd: C, 80.92; H, 8.33; N, 3.04. Found: C, 80.97; H, 8.42; N, 2.97.

I claim:
1. The compounds having the following Formula I,

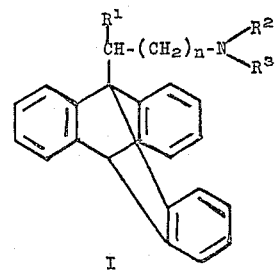

I wherein $R^1$ is selected from the group consisting of hydrogen and hydroxyl; $R^2$ and $R^3$ are selected from the group consisting of hydrogen and $C_1$–$C_{24}$ alkyl; $n$ is a number from 1 to 18; and the acid addition salts thereof.

2. 9-(β-amino-α-hydroxyethyl)triptycene.
3. 9-(3-aminopropyl)triptycene hydrochloride.
4. 9-(3-methylaminopropyl)triptycene hydrochloride.
5. 9-(8-aminooctyl)triptycene hydrochloride.
6. 9-(8-n-butylaminooctyl)triptycene hydrochloride.

References Cited

Kornfeld et al., "Jour. Med. Chem.," vol. 8, No. 3, pp. 342–7 (1965).

CHARLES B. PARKER, *Primary Examiner.*

R. HINES, *Assistant Examiner.*